US012556225B2

(12) United States Patent
Karpin et al.

(10) Patent No.: US 12,556,225 B2
(45) Date of Patent: Feb. 17, 2026

(54) ADAPTIVE FREQUENCY HOPPING (AFH) CHANNEL CLASSIFICATION ALGORITHM FOR NARROWBAND WIRELESS RADIO IN BATTERY MANAGEMENT SYSTEM-LIKE (BMS-LIKE) ENVIRONMENT

(71) Applicant: Cypress Semiconductor Corporation, San Jose, CA (US)

(72) Inventors: Oleksandr Karpin, Lviv (UA); Ruslan Omelchuk, Lviv (UA); Igor Kravets, Lviv (UA); Oleksandr Hoshtanar, Lviv (UA); Thiam Poh Tan, Singapore (SG); Ashok Kapur, Frederick, MD (US); Victor Zhodzishsky, Potomac, MD (US); Daniel Lee, Salt Lake City, UT (US)

(73) Assignee: Infineon Technologies Americas Corp., El Segundo, CA (US)

( * ) Notice: Subject to any disclaimer, the term of this patent is extended or adjusted under 35 U.S.C. 154(b) by 50 days.

(21) Appl. No.: 18/604,357

(22) Filed: Mar. 13, 2024

(65) Prior Publication Data

US 2025/0293727 A1 Sep. 18, 2025

(51) Int. Cl.
*H04B 1/715* (2011.01)
*H04B 17/318* (2015.01)
*H04L 1/20* (2006.01)

(52) U.S. Cl.
CPC .......... *H04B 1/715* (2013.01); *H04B 17/318* (2015.01); *H04L 1/203* (2013.01); *H04B 2001/7154* (2013.01); *H04B 2201/71323* (2013.01)

(58) Field of Classification Search
CPC .......... H04B 1/69; H04B 1/713; H04B 1/715; H04B 17/30; H04B 17/309; H04B 17/318; H04B 2001/7154; H04B 2201/713; H04B 2201/71323; H04B 2201/71307; H04B 2201/71346; H04B 2201/71376; H04L 1/203
See application file for complete search history.

(56) References Cited

U.S. PATENT DOCUMENTS

| 5,754,583 A | * | 5/1998 | Eberhardt | ............. | H04W 52/42 375/147 |
| 5,805,638 A | * | 9/1998 | Liew | ..................... | H04L 25/025 375/341 |

(Continued)

*Primary Examiner* — James M Perez

(57) ABSTRACT

Techniques are disclosed to detect deep fading caused by magnitude drop and rapid phase change on channels within a frequency band of a narrowband wireless radio operating in a BMS-like environment with strong multipath. The techniques may identify an interference channel, a deep fading channel, or a weak signal channel. A channel assessment algorithm may receive packets on one of multiple channels to determine a received signal strength for each packet associated with the channel. The algorithm may determine a PER associated with the channel based on a number of packets received in error and a difference between the received signal strength of each packet and a reference signal strength associated with other channels of the frequency band. The PER may be compared with a PER threshold. The channel may be excluded from use by the wireless radio if the PER for the channel is greater than the PER threshold.

20 Claims, 11 Drawing Sheets

(56) References Cited

U.S. PATENT DOCUMENTS

| | | | | |
|---|---|---|---|---|
| 6,088,595 A * | 7/2000 | Ciccone | H04B 1/713 | 455/463 |
| 7,460,876 B2 * | 12/2008 | Sadri | H04W 52/42 | 455/517 |
| 7,974,299 B1 * | 7/2011 | Banerjea | H04W 40/04 | 370/431 |
| 9,800,288 B2 * | 10/2017 | Seller | G01S 11/10 | |
| 10,164,722 B1 * | 12/2018 | Napoles | H04B 1/406 | |
| 10,511,939 B1 * | 12/2019 | Wihardja | H04W 4/80 | |
| 10,621,840 B2 * | 4/2020 | Garg | G08B 21/0415 | |
| 11,032,671 B2 * | 6/2021 | Wihardja | H04W 4/029 | |
| 11,151,850 B2 * | 10/2021 | Garg | G08B 13/2491 | |
| 2005/0005227 A1 * | 1/2005 | Felbecker | H04L 1/0061 | 714/776 |
| 2009/0185599 A1 * | 7/2009 | Chari | H04B 1/715 | 455/67.11 |
| 2011/0002371 A1 * | 1/2011 | Forenza | H04B 17/309 | 375/227 |
| 2011/0003606 A1 * | 1/2011 | Forenza | H04L 25/03343 | 455/501 |
| 2011/0261861 A1 * | 10/2011 | Lee | H04B 1/715 | 375/132 |
| 2012/0134390 A1 * | 5/2012 | Smadi | H04B 1/715 | 375/E1.033 |
| 2013/0077655 A1 * | 3/2013 | Chen | H04B 1/715 | 375/135 |
| 2013/0315153 A1 * | 11/2013 | Sebeni | H04L 1/0001 | 370/329 |
| 2014/0115417 A1 * | 4/2014 | Savin | H03M 13/118 | 714/755 |
| 2015/0257100 A1 * | 9/2015 | Su | H04W 48/16 | 455/574 |
| 2016/0261306 A1 * | 9/2016 | Seller | G01S 5/021 | |
| 2016/0381572 A1 * | 12/2016 | Shahar | H04W 4/80 | 455/41.2 |
| 2017/0134882 A1 * | 5/2017 | Kao | H04W 72/1215 | |
| 2017/0324441 A1 * | 11/2017 | Seller | G01S 5/0246 | |
| 2019/0035244 A1 * | 1/2019 | Garg | H04B 17/318 | |
| 2020/0100067 A1 * | 3/2020 | Wihardja | H04L 27/10 | |
| 2020/0175831 A1 * | 6/2020 | Garg | H04B 17/318 | |
| 2020/0228292 A1 * | 7/2020 | Nguyen | H04W 24/08 | |
| 2023/0231787 A1 * | 7/2023 | Huang | H04L 43/0823 | 709/224 |
| 2024/0080134 A1 * | 3/2024 | Zhu | G06F 3/162 | |
| 2024/0205699 A1 * | 6/2024 | Martin, II | H04W 24/02 | |
| 2024/0235605 A1 * | 7/2024 | Chen | H04B 1/713 | |
| 2024/0298343 A1 * | 9/2024 | Matsumoto | H04W 72/0453 | |
| 2025/0203416 A1 * | 6/2025 | Martin, II | H04L 1/0039 | |
| 2025/0293727 A1 * | 9/2025 | Karpin | H04B 17/318 | |

* cited by examiner

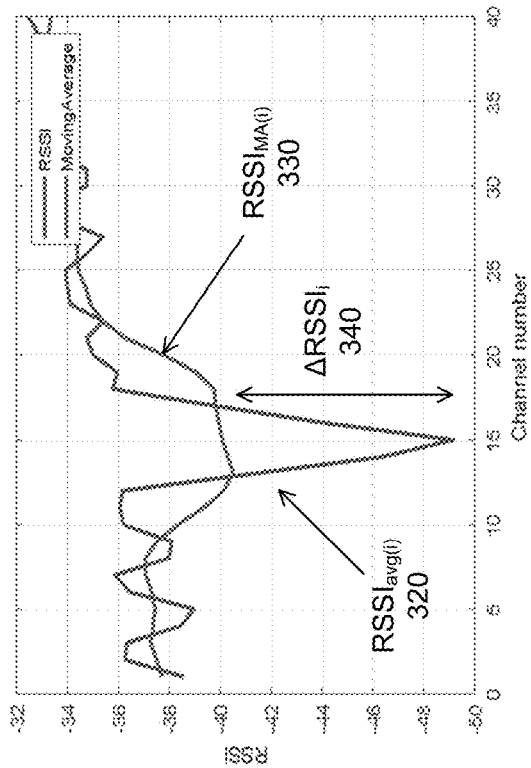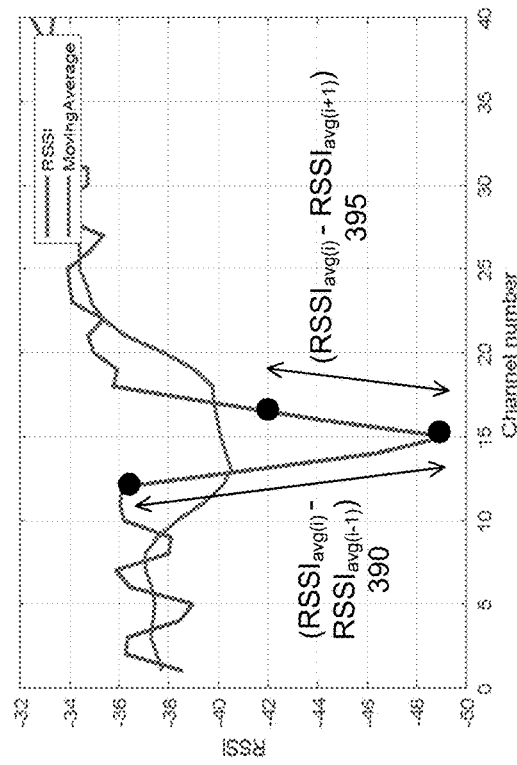
FIG. 3A
FIG. 3B

| Ch (610) | 1 | 2 | 3 | 4 | ... | 34 | 35 | 36 | 37 |
|---|---|---|---|---|---|---|---|---|---|
| PER (620) | 10% | 0% | 0% | 100% | | 100% | 50% | 7% | 1% |
| RSSI (630) | -20dbm | -30dmb | -35dbm | - | | -50dbm | -45dbm | -30dbm | -25dbm |
| Type (640) | Wi-Fi | - | - | Deep fade – weak signal | | Deep fade – rapid phase | Deep fade – rapid phase | - | - |
| Recovery time (650) | quick | quickest | quickest | slow | | slow | slow | quickest | quickest |

FIG. 6

ADAPTIVE FREQUENCY HOPPING (AFH) CHANNEL CLASSIFICATION ALGORITHM FOR NARROWBAND WIRELESS RADIO IN BATTERY MANAGEMENT SYSTEM-LIKE (BMS-LIKE) ENVIRONMENT

TECHNICAL FIELD

This disclosure generally relates to channel assessments in wireless communication. More specifically, but not by way of limitations, the disclosure relates to assessing or classifying channels for adaptive frequency hopping (AFH) algorithms when communicating using narrowband wireless signals in industrial, automobile, electronic, or other applications.

BACKGROUND

Short-range wireless communication in many industrial, automobile, home applications use narrowband radios based on technologies such as Bluetooth (BT), Bluetooth Low Energy (BLE), Wi-Fi, 802.15.4, etc., that share a transmission medium by operating in the industrial, scientific, medical (ISM) frequency bands. For example, a battery management system (BMS) of an electric vehicle may use BLE to continuously monitor voltages, currents, temperatures, and other operating characteristics of an array of battery cells to manage battery performance and to ensure functional safety of the battery. Because of the shared transmission medium, a transmitted data packet may be corrupted or lost if it collides with another packet being transmitted at the same time and on the frequency channel from another device.

One technique that BT or BLE uses to overcome interference and avoid packet collision is a form of frequency-hopping spread spectrum (FHSS) called adaptive frequency hopping (AFH). BT may divide the frequency band into smaller channels (e.g., 40 channels in the case of BLE) and may rapidly hop between the channels when transmitting packets. To further reduce the chance of interference, BT may adapt its hopping sequence as the term AFH suggests. Channels that are noisy and busy may be dynamically tracked using a channel selection algorithm and avoided when sending packets by "channel blacklisting." However, transmissions may fail due to many reasons, including weak signal strength, multipath fading, external radio interference, etc. While channel assessment techniques may identify noisy and busy channels due to transmissions from an interfering device, inside a shielded-metal battery box of a car BMS, external interference signals may be relatively weak. Instead, poor channel quality in such an environment may be due to internal effects such as multipath fading, signal shadowing, stationary standing waves, wideband noise from DC/DC converters, dynamic temperature and environmental factors associated with the battery operating in a vehicle, etc. Conventional channel assessment techniques geared toward tracking external interference sources may not adequately detect poor quality channels inherent in a BMS-like environment. The result is that AFH may not blacklist channels with poor quality, leading to poor transmission reliability, higher power consumption, and increased transmission delays. There is a need for an AFH algorithm that is effective in identifying channels experiencing deep multipath fading and shadowing effects inherent in a BMS-like environment.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

FIG. 3A depicts one example of the RSSI measured at a BLE receiver as a function of the channel numbers of a BLE frequency band and a metric to detect deep fading at a channel based on a difference between RSSI measured at the channel and a moving average of the RSSI across a range of channels according to an embodiment.

FIG. 3B depicts one example of the RSSI measured at a BLE receiver as a function of the channel numbers of a BLE frequency band and a metric to detect deep fading at a channel based on differences between RSSI measured at the channel and RSSIs measured at adjacent channels according to an embodiment.

FIG. 6 shows an AFH channel map containing information on the classification of the suspended channels and their associated PER and RSSI resulting from a scan of the channels in a BMS-like environment according to an embodiment.

DETAILED DESCRIPTION

Figure 1:
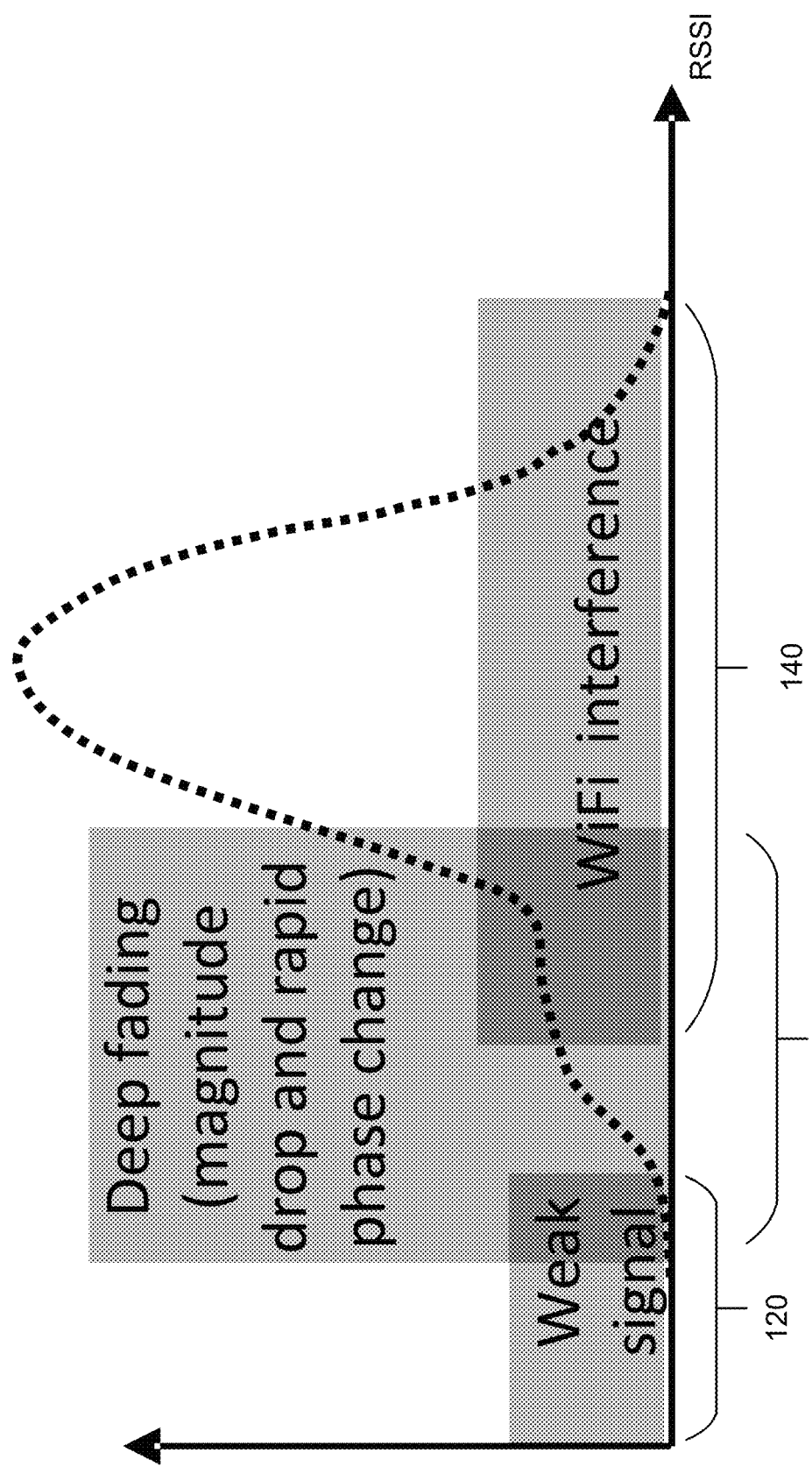
FIG. 1 depicts a histogram showing a distribution of the number of packets as a function of received signal strength indicator (RSSI) in a BMS environment and the external and internal factors that may contribute to failed packet reception across the range of RSSI in accordance with one aspect of the present disclosure.

In the following description, numerous specific details are set forth in order to provide a thorough understanding of the presented concepts. The presented concepts may be practiced without some or all of these specific details. In other instances, well known process operations have not been described in detail so as not to unnecessarily obscure the described concepts. While some concepts will be described in conjunction with the specific examples, it will be understood that these examples are not intended to be limiting.

Narrowband wireless communication technologies such as Bluetooth (BT), Bluetooth Low Energy (BLE), 802.11x (Wi-Fi), etc., may operate in different environments across a wide range of applications. Increasingly, a battery management system (BMS) deployed in an electrical vehicle may wirelessly monitor, report, and manage operating characteristics of cells of a battery using BLE. A wireless BMS architecture offers many advantages such as harness reduction, flexible placement, easy maintenance, lower assembly and labor cost. The BMS is typically housed in a metal car battery box to reduce interference from external radios such as Wi-Fi radios that share the transmission medium with BLE. BLE may use an adaptive frequency hopping (AFH) scheme to further mitigate interference when transmitting packets by rapidly hopping between narrow channels (e.g., 40 channels) of the 2.4 GHz ISM operating frequency band in a pattern mutually known to a transmitter and a receiver. In AFH, a BLE transceiver may perform a channel assessment to detect channels that are noisy and busy so as to adaptively avoid these channels (referred to as channel blacklisting) when the transceiver selects the hopping sequence.

In a metal-box operating environment such as the BMS, the quality of a channel may also degrade due to internal factors such as multipath fading, shadowing effect, stationary standing waves, etc. For example, a BMS may experience high packet error rate (PER) for some channels due to deep multipath fading and shadowing despite relatively strong signals (e.g., the received signal strength indicator (RSSI) is far greater than the receiver sensitivity). Multipath signal propagation may cause fluctuations in the received signal's amplitude, phase and angle of arrival. Severe drop in the channel signal-to-noise ratio and signal distortion (caused by rapid magnitude and phase jump) may result in failure of communication at certain channel frequencies. Other internal factors contributing to poor channel qualities and high PER may include wideband noise from DC/DC converters of the BMS, environmental variables such as the broad range of operating temperatures (−40° C. to +125° C.) due to heating and cooling of the vehicle, etc.

While an AFH algorithm may perform channel assessment to identify noise and busy channels for blacklisting these channels, channel assessment may not be effective in detecting channels experiencing strong multipath and shadowing effects encountered in a BMS-like environment. For example, channel assessment may measure the RSSI of packets received on a channel and collect the PER statistics of these packets to identify an interfering channel as one having a high RSSI and yet with a high PER. Conversely, channel assessment may measure the RSSI on blacklisted channels to determine whether to reclaim a blacklisted channel for AFH use when the RSSI of the channel from an interfering source falls below a threshold. These types of channel assessment are not intended to identify channels experiencing deep fading (e.g., RSSI is low) in a strong multipath and shadowing environment. As a result, these deep fading channels may be misinterpreted as interference-free and used by the hopping sequence when they should be blacklisted.

Disclosed are techniques to detect deep fading with low channel signal-to-noise ratio and signal distortion caused by rapid magnitude or phase change on channels within a frequency band of a narrowband wireless radio operating in a BMS-like environment with strong multipath. In one aspect, the techniques may identify a channel as a busy channel due to external interference, a channel experiencing deep fading due to rapid magnitude or phase change associated with multipath, or a channel with weak signal due to factors other than deep-fading. The AFH scheme may classify the blacklisted channels in an AFH channel map based on the channel characteristics identified by the channel assessment. The classification of the blacklisted channels in the AFH channel map may aid the AFH scheme in determining which channels to reclaim when the conditions of the channels or the operating environment change.

In one aspect, the channel assessment may dynamically adjust a packet error rate-threshold (PER-threshold) used for classifying deep-fading channels based on a number of blacklisted channels so there is a sufficient number of "good" channels for AFH. Advantageously, the disclosed channel assessment techniques may flexibly adapt to changing channel conditions in a BMS-like environment that has a mix of deep fading channels and noisy interfering channels to decrease PER when using an AFH scheme.

FIG. 1 depicts a histogram 100 showing a distribution of the number of packets as a function of RSSI in a BMS environment and the external and internal factors that may contribute to failed packet reception across the range of RSSI in accordance with one aspect of the present disclosure.

Packets received with low RSSI may be due to weak signal 120 caused by the construction and location of the battery rather than deep fading. A BLE transceiver may detect a weak signal channel by determining that the proportion of packets that are received in error on the channel and having measured RSSI below a weak signal threshold is greater than a PER threshold. The number of packets received with weak signal 120 may be relatively low. Weak signal channels may be characterized as semi-static channels and once blacklisted may be reclaimed slowly for AFH.

Packets received with measured RSSI higher than a weak signal threshold but lower than an interference signal threshold may be due to deep fading 130 caused by rapid magnitude and phase change associated with strong multipath and shadowing. A BLE transceiver may detect a deep fading channel by comparing the measured RSSI of packets received on the channel with the RSSI of packets received on other channels. For example, a BLE transceiver may measure the decrease in RSSI of a packet on the channel relative to the average RSSI of packets received on other channels. The BLE transceiver may determine whether this decrease in RSSI is greater than a delta threshold. If the proportion of packets that are received in error on the channel and having decreased RSSI satisfying this delta threshold condition is greater than a PER threshold, the BLE transceiver may classify the channel as a deep fading channel. The number of channels affected by deep fading 130 may be a function of the location of the BLE transceiver in the shielded-metal box of the BMS. Deep fading channels may also be characterized as semi-static channels because their channel characteristics tend to change slowly. Once blacklisted, deep fading channels may be reclaimed slowly for AFH.

Packets received in error but having relatively high RSSI (e.g., higher than an interference signal threshold) may be from Wi-Fi interference 140. A BLE transceiver may detect a Wi-Fi interfering channel by determining that the proportion of packets that are received in error on the channel despite having measured RSSI above an interference signal threshold is greater than a PER threshold. The number of channels affected by Wi-Fi interference 140 may be a function of the extent of frequency overlap between the BLE channels of the BMS and Wi-Fi channels operated by interfering sources. Wi-Fi interfering channels may be characterized as dynamic channels because their channel characteristics change when the interfering sources stop transmitting on the channels. Once blacklisted, Wi-Fi interfering channels may be quickly reclaimed for AFH if the interference stops.

Figure 2:
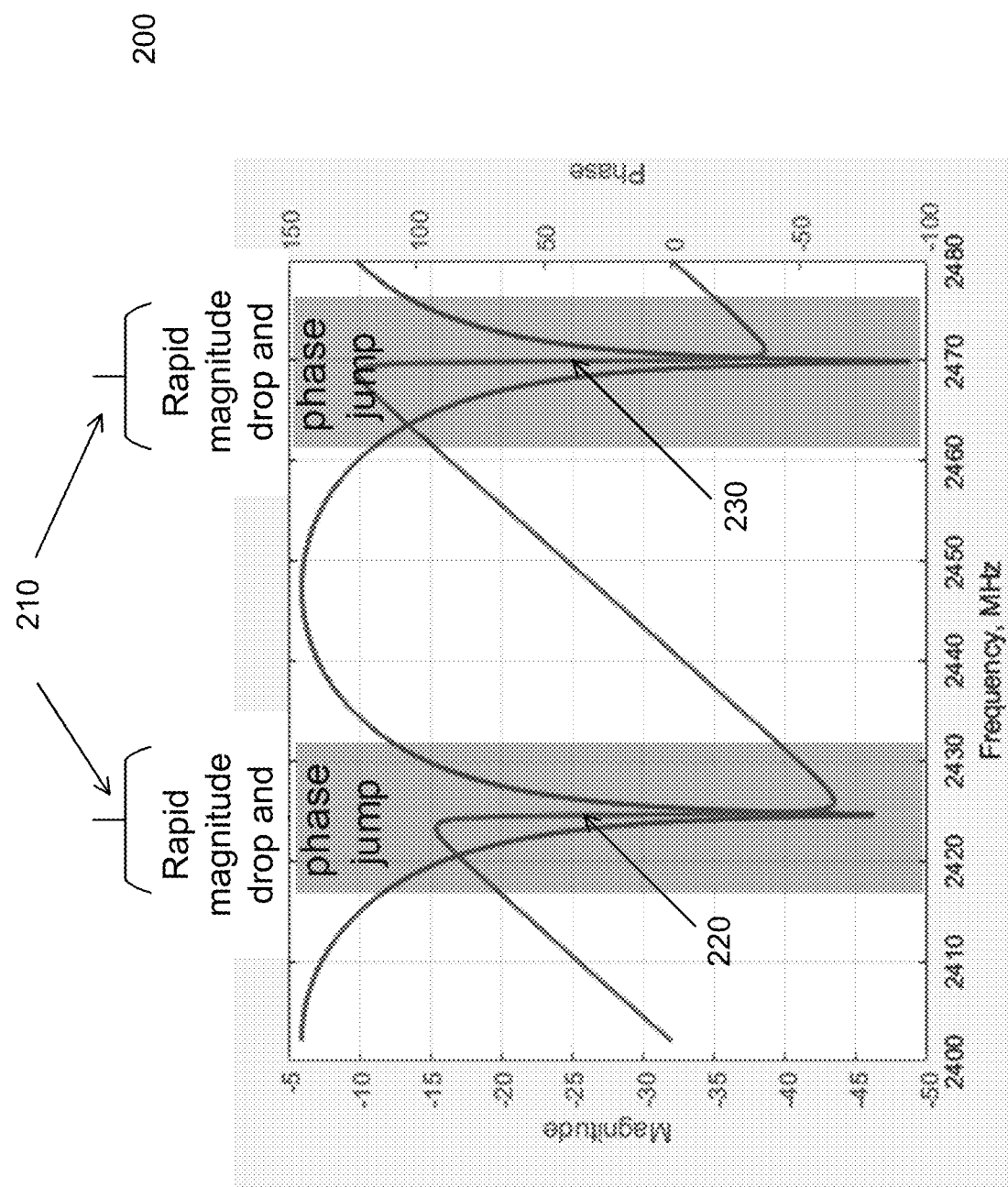
FIG. 2 depicts deep fading with rapid magnitude drop and rapid phase jump observed in a BMS environment due to multiple reflective paths as a function of the BLE operating frequencies in accordance with one aspect of the present disclosure.

FIG. 2 depicts deep fading 200 with rapid magnitude drop and rapid phase jump observed in a BMS environment due to multiple reflective paths as a function of the BLE operating frequencies in accordance with one aspect of the present disclosure.

The magnitude of received signals on frequency channels 210 may experience deep fading (e.g., −40 dB) due to rapid magnitude drop and phase jumps 220 and 230 associated with multipath and shadowing effect. Packets transmitted on frequency channels 210 may be received with sufficiently low RSSI to cause high PER. The rapid magnitude drop and phase jumps 220 and 230 may be manifested as RSSI exhibiting a large gradient in a narrow band of frequency channels (e.g., frequency channels 210). Techniques to detect deep fading channels may blacklist such channels in an AFH channel map to improve system performance when using AFH in a BMS-like environment.

FIG. 3A depicts one example of the RSSI measured at a BLE receiver as a function of the channel numbers of a BLE frequency band and a metric to detect deep fading at a channel based on a difference between RSSI measured at the channel and a moving average of the RSSI across a range of channels according to an embodiment. A channel assessment algorithm may use the metric to scan for channels subject to deep fading so as to exclude the channels from use by the AFH scheme.

The $RSSI_{avg(i)}$ 320 may represent the average RSSI measured for received packets at channel i of the BLE frequency band. Channel 15 may exhibit deep fading as shown by the steep gradient in $RSSI_{avg(i)}$ 320 at channel 15. A moving average $RSSI_{MA(i)}$ 330 may represent an average of the $RSSI_{avg(i)}$ 320 of the channels within a window of channels centered on channel i. The size of the window may be determined based on the operating environment of the BLE radio. The moving average $RSSI_{MA(i)}$ 330 may act as a low-pass filter to smooth fluctuations of the $RSSI_{avg(i)}$ 320 across the channels in the window. FIG. 3A shows that moving average $RSSI_{MA(i)}$ 330 takes a dip in the frequency band close to channel 15. In other embodiments, moving average $RSSI_{MA(i)}$ 330 may be replaced by a single $RSSI_{avg}$ representing the average of $RSSI_{avg(i)}$ 320 across all 40 channels, or by other types of filters.

A channel assessment algorithm may calculate $\Delta RSSI_i$ 340 for channel i as the difference between $RSSI_{avg(i)}$ 320 of channel i and moving average $RSSI_{MA(i)}$ 330 associated with channel i. For example, $\Delta RSSI_i$ 340 for channel 15 may represent the difference between $RSSI_{avg(i)}$ 320 of channel 15 and moving average $RSSI_{MA(i)}$ 330 centered on channel 15. Because of the steep gradient of $RSSI_{avg(i)}$ 320 at channel 15, $\Delta RSSI_i$ 340 for channel 15 is large. The steeper the gradient of $RSSI_{avg(i)}$ 320 at a channel, the larger the $\Delta RSSI_i$ 340 for that channel. The channel assessment algorithm may compare the $\Delta RSSI_i$ 340 for channel i with a gradient threshold $Th_{grad}$ to determine if channel i is a deep fading channel (e.g., $(\Delta RSSI_i = RSSI_{avg(i)} - RSSI_{MA(i)}) < -Th_{grad}$).

FIG. 3B depicts one example of the RSSI measured at a BLE receiver as a function of the channel numbers of a BLE frequency band and a metric to detect deep fading at a channel based on differences between RSSI measured at the channel and RSSIs measured at adjacent channels according to an embodiment.

Instead of using $RSSI_{MA(i)}$ 330 for the metric, a channel assessment algorithm may calculate the difference between $RSSI_{avg(i)}$ of channel i with $RSSI_{avg(i)}$ of its two adjacent channels i−1 and i+1, respectively. For example, $(RSSI_{avg(i)} - RSSI_{avg(i-1)})$ 390 for channel 15 may represent the difference between $RSSI_{avg(i)}$ 320 of channel 15 and $RSSI_{avg(i)}$ 320 of channel 14. $(RSSI_{avg(i)} - RSSI_{avg(i+1)})$ 395 for channel 15 may represent the difference between $RSSI_{avg(i)}$ 320 of channel 15 and $RSSI_{avg(i)}$ 320 of channel 16. The channel assessment algorithm may compare $(RSSI_{avg(i)} - RSSI_{avg(i-1)})$ 390 or $(RSSI_{avg(i)} - RSSI_{avg(i+1)})$ 395 for channel i with a gradient threshold $Th_{grad}$ to determine if channel i is a deep fading channel (e.g., $((RSSI_{avg(i)} - RSSI_{avg(i-1)}) < -Th_{grad})$ or $((RSSI_{avg(i)} - RSSI_{avg(i+1)}) < -Th_{grad})$).

FIGS. 3A and 3B show that deep fading may be characterized by a steep gradient of $RSSI_{avg(i)}$ 320 over one channel or a narrow range of channels. In contrast, a slow gradient of $RSSI_{avg(i)}$ 320 may not indicate deep fading. A large reduction in $RSSI_{avg(i)}$ 320 occurring over a relatively wide range of channels also may not indicate deep fading. Instead, these types of variations in $RSSI_{avg(i)}$ 320 may be characteristics of weak transmitted signals. In both scenarios, $RSSI_{avg(i)}$ 320 and $RSSI_{MA(i)}$ 330 may track each other relatively closely so that the metric $(\Delta RSSI_i = RSSI_{avg(i)} - RSSI_{MA(i)})$ may not exceed the gradient threshold $Th_{grad}$.

In one embodiment, a channel assessment algorithm may determine the difference ($\Delta RSSI$) between the measured RSSI of a packet received on a channel with the moving average $RSSI_{MA(i)}$ 330 centered around the channel or the $RSSI_{avg(i)}$ 320 of adjacent channels as described for FIG. 3A or FIG. 3B. The channel assessment algorithm may accumulate the number of packets received in error on the channel when the associated $\Delta RSSI$ is greater than a gradient threshold $Th_{grad}$. If the proportion of error packets whose $\Delta RSSI$ is greater than the gradient threshold $Th_{grad}$ exceeds a PER threshold, the channel assessment algorithm may classify the channel as a deep fading channel.

Figure 4:
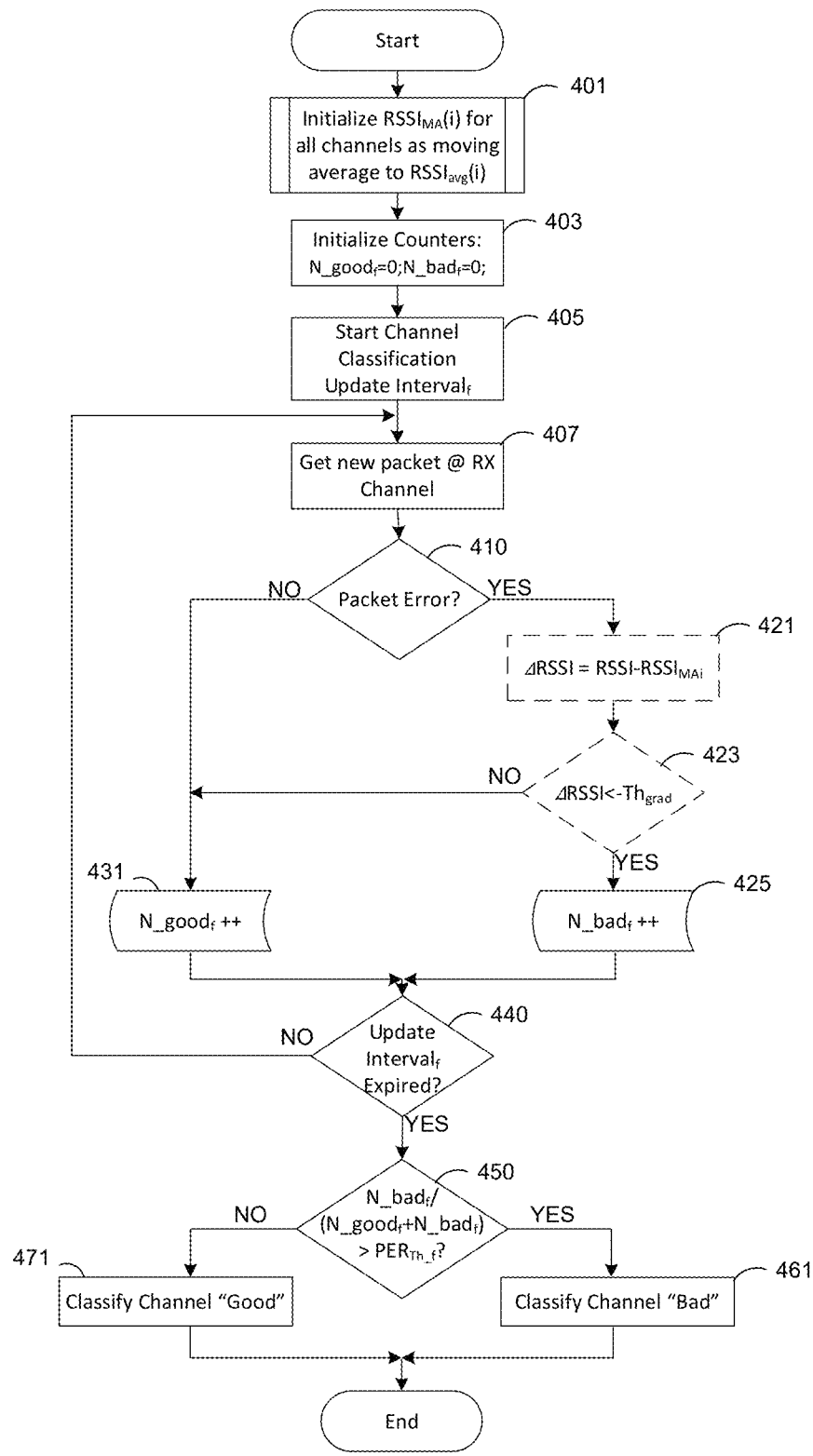
FIG. 4 is a flow diagram illustrating a method for a BLE receiver to scan a BLE channel for deep fading when receiving packets on the channel to determine whether to suspend the channel for AFH according to an embodiment.

FIG. 4 is a flow diagram illustrating a method 400 for a BLE receiver to scan a BLE channel for deep fading when receiving packets on the channel to determine whether to suspend the channel for AFH according to an embodiment. Method 400 may be part of a channel assessment algorithm performed by a BLE receiver to classify deep fading channels for an AFH channel map.

In operation 401, the BLE receiver may initialize a $RSSI_{MA(i)}$ (e.g., $RSSI_{MA(i)}$ 330 of FIGS. 3A and 3B) as a moving window average of $RSSI_{avg(i)}$ of channels within a window centered on channel i. It is assumed that $RSSI_{avg(i)}$ of BLE channels have previously been compiled by the BLE receiver or obtained from another source. In one embodiment, to eliminate a system calibration procedure, $RSSI_{MA(i)}$ may be replaced by a single $RSSI_{avg}$ representing the average of $RSSI_{avg(i)}$ across all channels (e.g., 40 channels) of a BLE frequency band, or by other types of filters.

In operation 403, the BLE receiver may initialize a counter $N\_good_f$ to keep a count of packets interpreted as not corrupted by deep fading over a channel, and a counter $N\_bad_f$ to keep a count of packets interpreted as corrupted by deep fading over the channel. The BLE receiver may maintain a pair of $N\_good_f$ and $N\_bad_f$ counters for each of the BLE channels.

In operation 405, the BLE receiver may start a channel classification update interval (e.g., 3 seconds) over which the BLE receiver may scan for packets received over one or more channel to determine whether any one channel is subject to deep fading. In one embodiment, the BLE receiver may scan for packets until a configured number of packets (e.g., 50 packets) have been received over a channel or until a PER threshold is exceeded.

In operation 407, the BLE receiver may receive packets over one or more channels. The BLE receiver may measure the RSSI of each packet.

In operation 410, the BLE receiver may determine whether a packet is received in error. For example, a packet may be received in error when it fails a cyclic redundancy check (CRC) or when there is a synchronization timeout.

In operation 421, if a packet is received in error over a channel, the BLE receiver may determine the difference ($\Delta$RSSI) between the measured RSSI of the packet with the moving average $RSSI_{MA(i)}$ 330 associated with the channel. The $\Delta$RSSI may be similar to the $\Delta RSSI_i$ 340 as described for FIG. 3A. However, operation 421 may determine $\Delta$RSSI on a packet-by-packet basis ($\Delta RSSI=RSSI_{packet\_on\_i}-RSSI_{MA(i)}$), rather than at the aggregate channel basis ($\Delta RSSI_i=RSSI_{avg(i)}-RSSI_{MA(i)}$) of FIG. 3A. In one embodiment, the BLE receiver may determine the difference ($\Delta$RSSI) between the measured RSSI of the packet on the channel i with the $RSSI_{avg(i)}$ of adjacent channels (i−1) and (i+1). The $\Delta$RSSI may be similar to the ($RSSI_{avg(i)}-RSSI_{avg(i-1)}$) 390 or ($RSSI_{avg(i)}-RSSI_{avg(i+1)}$) 395 as described for FIG. 3B. However, operation 421 may determine $\Delta$RSSI on a packet-by-packet basis ($\Delta RSSI=RSSI_{packet\_on\_i}-RSSI_{avg(i-1)}$) or ($\Delta RSSI=RSSI_{packet\_on\_i}-RSSI_{avg(i+1)}$) rather than at the aggregate channel basis ($RSSI_{avg(i)}-RSSI_{avg(i-1)}$) 390 or ($RSSI_{avg(i)}-RSSI_{avg(i+1)}$) 395 of FIG. 3B.

In operation 423, the BLE receiver may determine if the $\Delta$RSSI for a packet is more than a gradient threshold $Th_{grad}$ (e.g., $\Delta RSSI < -Th_{grad}$ when expressed in dB). The gradient threshold $Th_{grad}$ may represent the $\Delta$RSSI above which a packet may be interpreted as experiencing deep fading. $Th_{grad}$ may be preconfigured individually for each channel, or with the same value for all channels. In one embodiment, $Th_{grad}$ may be dynamically changed as the operating environment changes.

In operation 425, if the $\Delta$RSSI for a packet received over a channel is more than a gradient threshold $Th_{gra}$ for the channel, the BLE receiver may increment the $N\_bad_f$ counter for the channel to indicate that the packet is corrupted by deep fading and to keep a running count of the number of packets corrupted by deep fading on the channel during the channel classification update interval.

In operation 431, if the $\Delta$RSSI for a packet received over a channel is not more than a gradient threshold $Th_{gra}$ for the channel, the BLE receiver may increment the $N\_good_f$ counter for the channel to indicate that the packet is not corrupted by deep fading even though the packet is received in error and to keep a running count of the number of such packets on the channel during the channel classification update interval. Such packets may be corrupted by noise or interference rather than deep fading. Similarly, from operation 410, if the packet is correctly received over a channel, the BLE receiver may also increment the $N\_good_f$ counter for the channel to indicate that the packet is not corrupted by deep fading.

In operation 440, the BLE receiver may determine if the channel classification update interval has expired. If not, the BLE receiver may receive additional packets over one or more channels to determine if any of the packets are corrupted by deep fading and to accumulate the $N\_good_f$ and $N\_bad_f$ counters for the corresponding channels accordingly.

Otherwise, if the channel classification update interval has expired, in operation 450, the BLE receiver may determine if the proportion of the packets that have been corrupted by deep fading over the channel classification update interval for a channel is greater than a PER threshold. For example, the BLE receiver may determine if ($N\_bad_f/(N\_bad_f+N\_good_f)$) for a channel is greater than $PER_{Th\_f}$, where $PER_{Th\_f}$ is the PER threshold for deep fading. ($N\_bad_f/(N\_bad_f+N\_good_f)$) for a channel may be interpreted as the measured PER due to deep fading for the channel.

In operation 461, if (($N\_bad_f/(N\_bad_f+N\_good_f)$) > $PER_{Th\_f}$) for a channel, the BLE receiver may classify the channel as a "bad" channel due to deep fading. In one embodiment, the BLE receiver may also classify one or more neighboring channels of a bad channel as bad channels but making the classification using a lower $PER_{Th\_f}$. The BLE receiver may suspend (also referred to as blacklist) a bad channel in the AFH channel map to exclude the channel from use by the AFH scheme. In one embodiment, the AFH channel map may store the measured PER, the average of the measured RSSI (e.g., $RSSI_{avg(i)}$), and the channel number for each bad channel.

In operation 471, if (($N\_bad_f/(N\_bad_f+N\_good_f)$) ≤ $PER_{Th\_f}$) for a channel, the BLE receiver may classify the channel as a "good" channel in the AFH channel map so that the channel is suitable for use by the AFH scheme.

In one embodiment, the $PER_{Th\_f}$ may be very small (e.g., ~0.01) and may be dynamically adjusted to improve the AFH channel classification in response to changing operating conditions and to ensure that there are a sufficient number of good channels for use by the AFH scheme. For example, if there are not a sufficient number of good channels, the BLE receiver may reclaim blacklisted channel(s) that have the lowest/lower PER or highest/higher $RSSI_{avg(i)}$ in the AFH channel map. The BLE receiver may increase the $PER_{Th\_f}$ for the reclaimed channels so that at the next channel classification update interval, the reclaimed channels are not immediately blacklisted if the measured PER remains the same. On the other hand, if there are few blacklisted channels and some good channels experience low level deep fading but not enough to be blacklisted, the BLE receiver may decrease the $PER_{Th\_f}$ to try to catch some of these channels that have higher measured PER due to deep fading to suspend them.

In one embodiment, a channel assessment algorithm may scan not only for deep fading channels, but also for weak signal channels and Wi-Fi interference channels based on the measured RSSI and PER of packets received on the channels. The channel assessment algorithm may classify the blacklisted channels in the AFH channel map as belonging to the categories of deep-fading, weak signal, or Wi-Fi interference channels. Blacklisted channels classified as Wi-Fi interference channels may be checked more frequently to determine whether they can be reclaimed for AFH (e.g., faster recovery time) than for deep fading channels due to the dynamic nature of Wi-Fi interference compared to the semi-static nature of deep fading associated with multipath.

Figure 5:
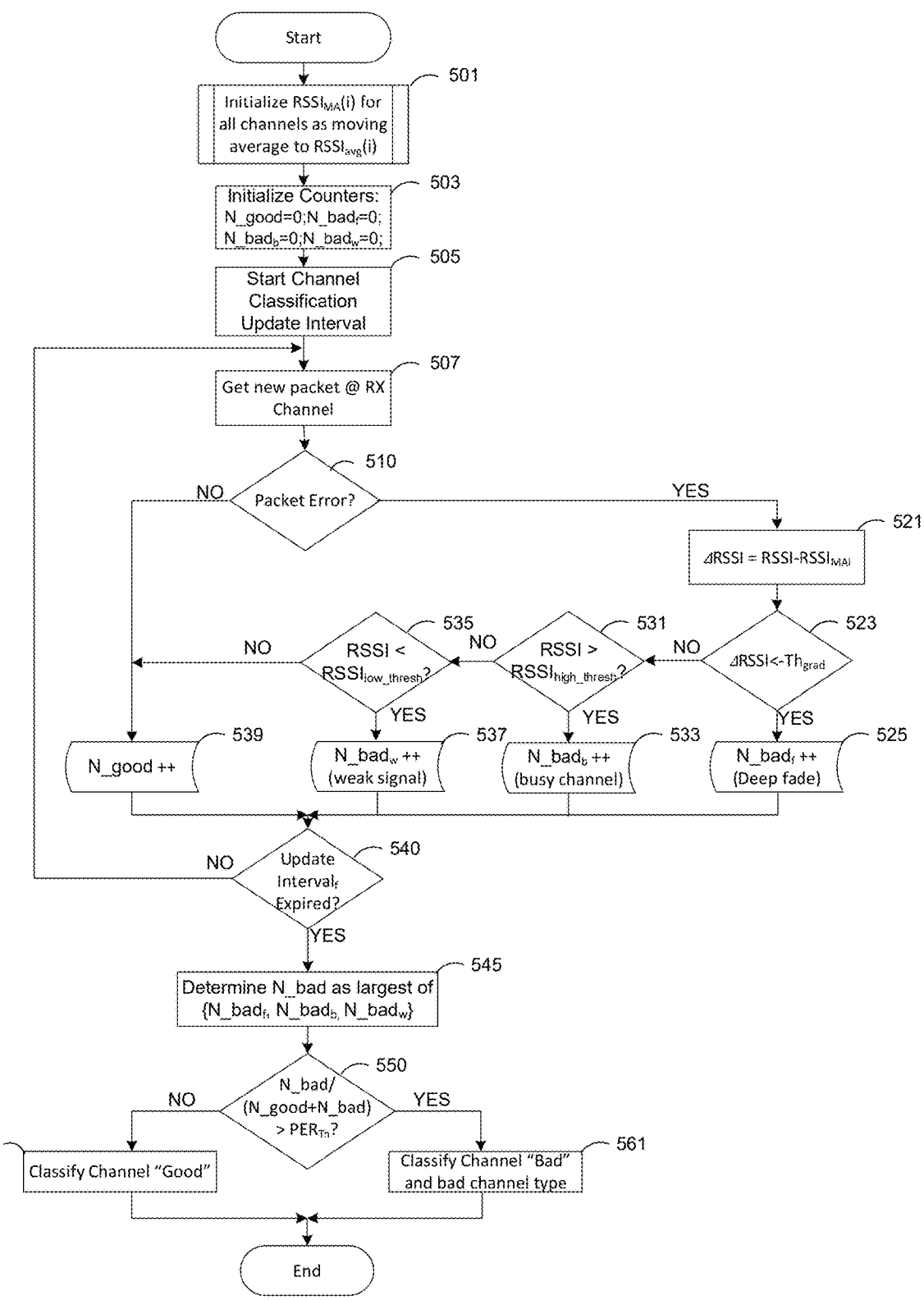
FIG. 5 is a flow diagram illustrating a method for a BLE receiver to scan a BLE channel for deep fading, radio interference, or weak signal when receiving packets on the channel to determine whether to suspend the channel for AFH according to an embodiment.

FIG. 5 is a flow diagram illustrating a method 500 for a BLE receiver to scan a BLE channel for deep fading, radio interference, or weak signal when receiving packets on the channel to determine whether to suspend the channel for AFH according to an embodiment. Method 500 may be part of a channel assessment algorithm performed by a BLE receiver to classify types of suspended channel for an AFH channel map.

Operations 501 to initialize a moving window average $RSSI_{MA(i)}$ of $RSSI_{avg(i)}$ of channels associated with channel i may be similar to operation 401 of FIG. 4 and will not be repeated for sake of brevity.

Operation 503 may initialize a N_good counter for each BLE channel to count the number of packets interpreted as not corrupted by deep fading, radio interference, or weak signal over the channel, a $N\_bad_f$ counter to count the number of packets interpreted as corrupted by deep fading over each channel, a $N\_bad_b$ counter to count the number of packets interpreted as corrupted by radio interference (e.g., busy channel due to Wi-Fi interference) over each channel, and a $N\_bad_w$ counter to count the number of packets interpreted as weak signal packets over each channel.

Operation 505 to start a channel classification update interval may be similar to operation 405 of FIG. 4 and will not be repeated for sake of brevity.

Operation 507 to measure RSSI of packets received over one or more channels may be similar to operation 407 of FIG. 4 and will not be repeated for sake of brevity.

Operation 510 to determine whether a packet is received in error may be similar to operation 410 of FIG. 4 and will not be repeated for sake of brevity.

Operation 521 to determine the $\Delta$RSSI between the measured RSSI of a packet on a channel with the moving average $RSSI_{MA(i)}$ 330 associated with the channel may be similar to operation 421 of FIG. 4. In one embodiment, operation 521 may determine the $\Delta$RSSI between the measured RSSI of a packet on channel i with the $RSSI_{avg(i)}$ of adjacent channels (i–1) and (i+1).

Operation 523 to determine whether the $\Delta$RSSI for a packet is more than a gradient threshold $Th_{grad}$ (e.g., $\Delta RSSI < -Th_{grad}$ when expressed in dB) may be similar to operation 423 of FIG. 4 and will not be repeated for sake of brevity.

Operation 525 to increment the $N\_bad_f$ counter for the channel to indicate that a packet on the channel is corrupted by deep fading when the $\Delta$RSSI for the packet is more than the gradient threshold $Th_{grad}$ is similar to operation 425 of FIG. 4 and will not be repeated for sake of brevity.

In operation 531, if the $\Delta$RSSI for a packet received over a channel is not more than a gradient threshold $Th_{gra}$ for the channel (e.g., packet interpreted as not corrupted by deep fading), the BLE receiver may determine if the measured RSSI for the packet is more than a RSSI threshold $RSSI_{high\_thresh}$. The $RSSI_{high\_thresh}$ may represent the interference RSSI threshold above which a packet may be interpreted as corrupted by the interference from an external source (e.g., Wi-Fi transmission). A BLE receiver would normally receive the packet having an RSSI greater than $RSSI_{high\_thresh}$ without error if not for the interfering transmission. $RSSI_{high\_thresh}$ may be preconfigured individually for each channel, or with the same value for all channels. In one embodiment, $RSSI_{high\_thresh}$ may be dynamically changed as the operating environment changes.

In operation 533, if the measured RSSI for a packet received over a channel is more than $RSSI_{high\_thresh}$ for the channel, the BLE receiver may increment the $N\_bad_b$ counter for the channel to indicate that the packet is corrupted by interference on a busy channel and to keep a running count of the number of packets corrupted by interference on the channel during the channel classification update interval.

In operation 535, if the measured RSSI for a packet received over a channel is not more than $RSSI_{high\_thresh}$ for the channel (e.g., packet interpreted as not corrupted by deep fading nor by interference), the BLE receiver may determine if the measured RSSI for the packet is less than a RSSI threshold $RSSI_{low\_thresh}$. The $RSSI_{low\_thresh}$ may be less than the $RSSI_{high\_thresh}$. The $RSSI_{low\_thresh}$ may represent the RSSI threshold below which a channel may be interpreted as having poor signal quality for reasons other than deep fading (e.g., due to the location of the BLE receiver, the geometry of the BMS-like environment, etc.).

In operation 535, if the measured RSSI for a packet receiver over a channel is less than $RSSI_{low\_thresh}$ for the channel, the BLE receiver may increment the $N\_bad_w$ counter for the channel to indicate that the packet is corrupted because of weak signal and to keep a running count of the number of weak signal packets on the channel during the channel classification update interval.

In operation 539, if the measured RSSI for a packet receiver over a channel is not less than $RSSI_{low\_thresh}$ for the channel, the BLE receiver may increment the N_good counter for the channel to indicate that the packet is not corrupted by deep fading, interference, or weak signal even though the packet is received in error and to keep a running count of the number of such packets on the channel during the channel classification update interval. Similarly, from operation 510, if the packet is correctly received over a channel, the BLE receiver may also increment the N_good counter for the channel.

In operation 540, the BLE receiver may determine if the channel classification update interval has expired. If not, the BLE receiver may receive additional packets over one or more channels to determine if any of the packets are corrupted by deep fading, interference, or weak signal and to accumulate the corresponding N_good, $N\_bad_f$, $N\_bad_b$, or $N\_bad_w$ counters for the corresponding channels.

In operation 545, the BLE receiver may determine the largest count among the $N\_bad_f$, $N\_bad_b$, or $N\_bad_w$ counters for a channel. A BLE receiver may receive corrupted packets of multiple types (e.g., see FIG. 1 for the overlapping regions of RSSI corresponding to deep fading 130 and RSSI corresponding Wi-Fi interference). In one embodiment, packets receiver over a channel may experience one dominant type of corruption. In one embodiment, packets received over a packet may experience exclusively one type of corruption. Operation 545 may determine the number of packets corrupted by a dominant type or an exclusive type of corruption as N_bad.

In operation 550, the BLE receiver may determine if the proportion of packets interpreted as corrupted over the channel classification update interval for a channel is greater than a PER threshold. For example, the BLE receiver may determine if (N_bad/(N_bad+N_good)) for a channel is greater than $PER_{Th}$.

In operation 561, if $((N\_bad/(N\_bad+N\_good)) > PER_{Th})$ for a channel, the BLE receiver may classify the channel as a "bad" channel due to deep fading, interference, or weak signal as determined by the dominant type of corruption associated with N_bad. The BLE receiver may suspend a bad channel in the AFH channel map to exclude the channel from use by the AFH scheme. In one embodiment, the AFH channel map may store the measured PER, the average of the measured RSSI (e.g., $RSSI_{avg(i)}$), the channel classification, and the channel number for each bad channel. In one embodiment, the $PER_{Th}$ may be dynamically adjusted to improve AFH channel classification in response to changing operating conditions and to ensure that there are a sufficient number of channels for use by the AFH scheme.

In operation 571, if (N_bad/(N_bad+N_good))≤$PER_{Th}$ for a channel, the BLE receiver may classify the channel as a "good" channel in the AFH channel map so that the channel is suitable for use by the AFH scheme.

FIG. 6 shows an AFH channel map 600 containing information on the classification of the suspended channels and their associated PER and RSSI resulting from a scan of the channels in a BMS-like environment according to an embodiment. In one embodiment, method 400 FIG. 4 or the method 500 of FIG. 5 may generate the AFH channel map 600.

The AFH channel map 600 shows the channel number 610, measured PER 620, average RSSI 630, bad channel type 640, and the recovery time 650 associated with each channel. The channel number 610, measured PER 620, average RSSI 630, and bad channel type 640 may be provided by the methods of FIG. 4 or 5.

For example, channel 1 has a PER of 10% and an average RSSI of −20 dbm. Channel 1 has been classified as a Wi-Fi interference channel based on the high PER despite the relatively high average RSSI. Channel 1 is associated with a quick recovery time to indicate the channel can be reclaimed for AFH more frequently than deep fading channels due to the dynamic nature of Wi-Fi interference compared to the semi-static nature of deep fading associated with multipath. Channel 1 is suspended for use by the AFH scheme. In one embodiment, the AFH channel map 600 may order the channels based on the PER or the average RSSI (e.g., ordering channels from good to bad based on the quality metric) so that the channel assessment algorithm may reclaim suspended channels associated with better quality metric first.

Channel 34 has a PER of 100% and an average RSSI of −50 dBm. Channel 34 has been classified as a deep fading channel due to rapid magnitude drop and phase jump associated with multipath. Channel 34 is associated with a slow recovery time because of the semi-static nature of deep fading associated with multipath. Similarly, channels 4 and 35 are classified as deep fading channels. Channels 4, 34, and 35 are suspended for use by the AFH scheme.

Channels 2 and 3 are classified as good channels due to zero packet error and may be used for AFH. Channels 36 and 37 exhibit relatively high PER despite relatively high average RSSI. Channels 36 and 37 may be interpreted as susceptible to Wi-Fi interference but are may still be used for AFH because the PER does not exceed a threshold. A channel assessment algorithm may receive additional packets on the channels to determine whether to suspend the channels if the interference continues.

As previously described, the $PER_{Th\_f}$ used to classify channels as deep fading channels may be dynamically adjusted to improve AFH channel classification in response to changing operating conditions and to ensure that there are a sufficient number of channels for use by the AFH scheme.

Figure 7:
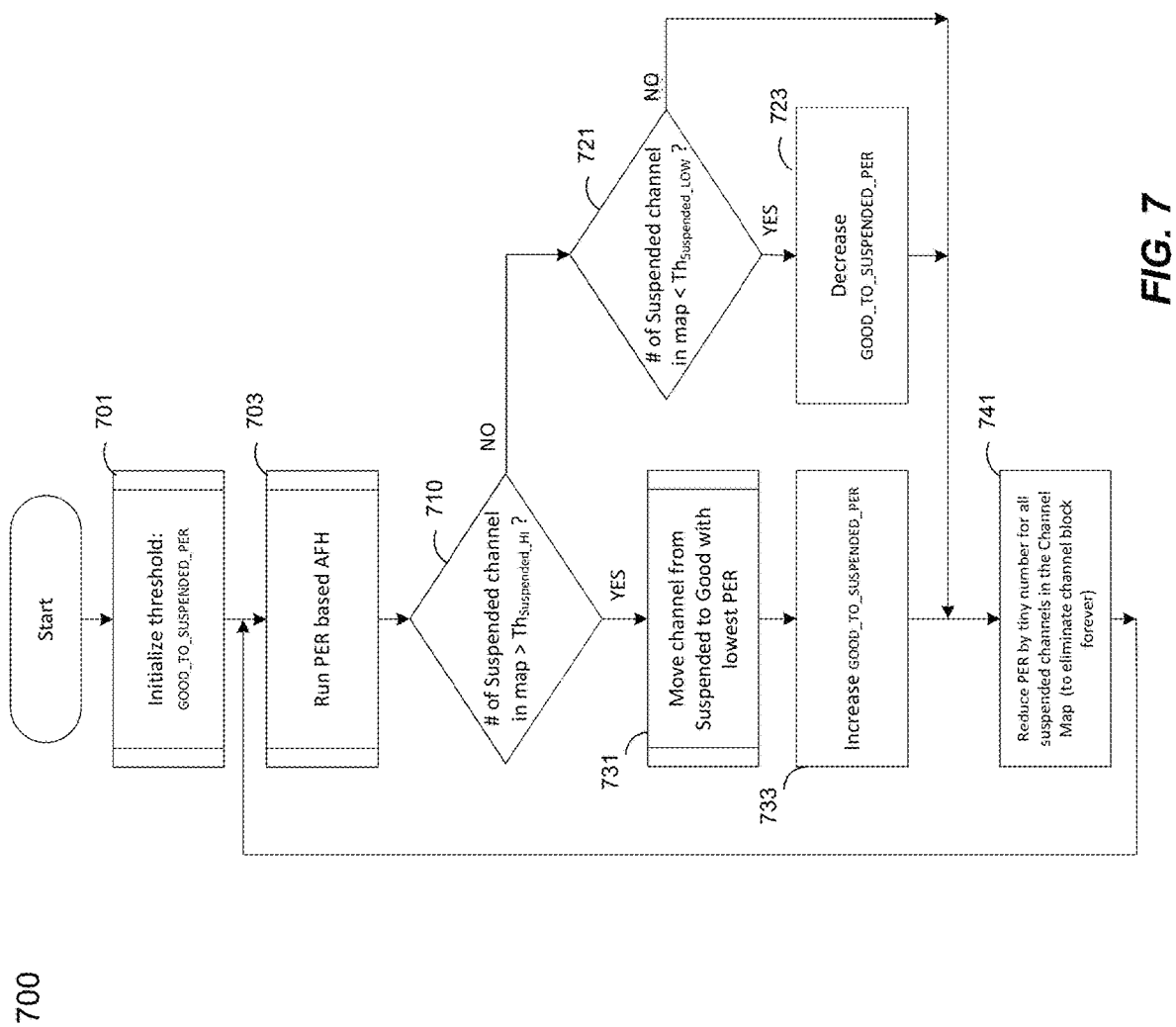
FIG. 7 is a flow diagram illustrating a method for a BLE receiver to classify BLE channels for AFH when receiving packets by dynamically adjusting a packet error rate-threshold (PER-threshold) used for the channel classification based on a number of suspended channels according to an embodiment.

FIG. 7 is a flow diagram illustrating a method 700 for a BLE receiver to classify BLE channels for AFH when receiving packets by dynamically adjusting a PER-threshold used for the channel classification based on a number of suspended channels according to an embodiment. Method 700 may be part of a channel assessment algorithm performed by a BLE receiver to update an AFH channel map.

In operation 701, the BLE receiver may initialize a PER-threshold (good_to_suspended_PER) used to suspend a channel if the measured PER for the channel exceeds the PER_threshold. In one embodiment, good_to_suspended_PER may be the PER threshold for deep fading ($PER_{Th\_f}$) of FIG. 4.

In operation 703, the BLE receiver may run the channel assessment algorithm to measure the PER for the channels of a frequency band and to update the AFH channel mapping based on the measured PER. In one embodiment, operation 703 may be method 400 of FIG. 4 or method 500 of FIG. 5. The AFH channel map may contain information on the classification of suspended channels as shown in FIG. 6.

In operation 710, the BLE receiver may determine if the number of suspended channels in the AFH channel map is greater than a threshold $Th_{suspended\_Hi}$. $Th_{suspended\_Hi}$ may represent the maximum number of suspended channels to ensure there are a sufficient number of good channels available for AFH. $Th_{suspended\_Hi}$ may be configured based on the number of channels (e.g., 40) in the frequency band and the operating environment.

In operation 731, if the number of suspended channels in the AFH channel map is greater than $Th_{suspended\_Hi}$, the BLE receiver may move one or more suspended channels that have the lowest PER among all suspended channels in the AFH channel map from the suspended classification to good. The BLE receiver may thus reclaim suspended channel(s) that experience the least deep fading. For example, in the AFH channel map of FIG. 6, the BLE receiver may reclaim channel 35 because it has the lowest measured PER among the channels classified as deep fading channels.

In operation 733, the BLE receiver may increase the PER-threshold good_to_suspended_PER so that at the next channel classification update interval, the reclaimed channels are not immediately re-suspended if the measured PER for the reclaimed channels remains the same.

If, on the other hand, the number of suspended channels in the AFH channel map is not greater than $Th_{suspended\_Hi}$, in operation 721, the BLE receiver may determine if the number of suspended channels in the AFH channel map is less than a threshold $Th_{suspended\_Low}$. $Th_{suspended\_Low}$ may represent the minimum number of expected suspended channels. If the number of suspended channels is less than $Th_{suspended\_Low}$, it may indicate that the PER-threshold (good_to_suspended_PER) may have been set too high. $Th_{suspended\_Low}$ may be configured based on the operating environment.

In operation 723, if the number of suspended channels in the AFH channel map is less than $Th_{suspended\_Low}$, the BLE receiver may decrease the PER-threshold (good_to_suspended_PER) so that at the next channel classification update interval, the channel assessment algorithm may suspend channel(s) that have higher measured PER than the lowered PER-threshold (good_to_suspended_PER).

If the number of number of suspended channels in the AFH channel map is not less than $Th_{suspended\_Low}$, in operation 741, the BLE receiver may reduce the measured PER for all suspended channels in the AFH channel map by a small amount (e.g., 0.1%). Reducing the measured PER for the suspended channels after each channel classification update interval may eliminate the possibility that channels are suspended indefinitely by increasing the chance that a suspended channel may be reclaimed. Similarly, after increasing the PER-threshold (good_to_suspended_PER) in operation 733 or decreasing the PER-threshold (good_to__suspended_PER) in operation 723, the BLE receiver may invoke operation 741 to reduce the measured PER for all suspended channels in the AFH channel map by a small amount.

After operation 741, the BLE receiver may run the channel assessment algorithm in operation 703 for the next channel classification update interval to update the AFH channel map. Operations 710, 731, 733, 721, 723, and 741 may be repeated after every channel classification update interval to dynamically adjust the PER-threshold (good_to_suspended_PER).

Figure 8:
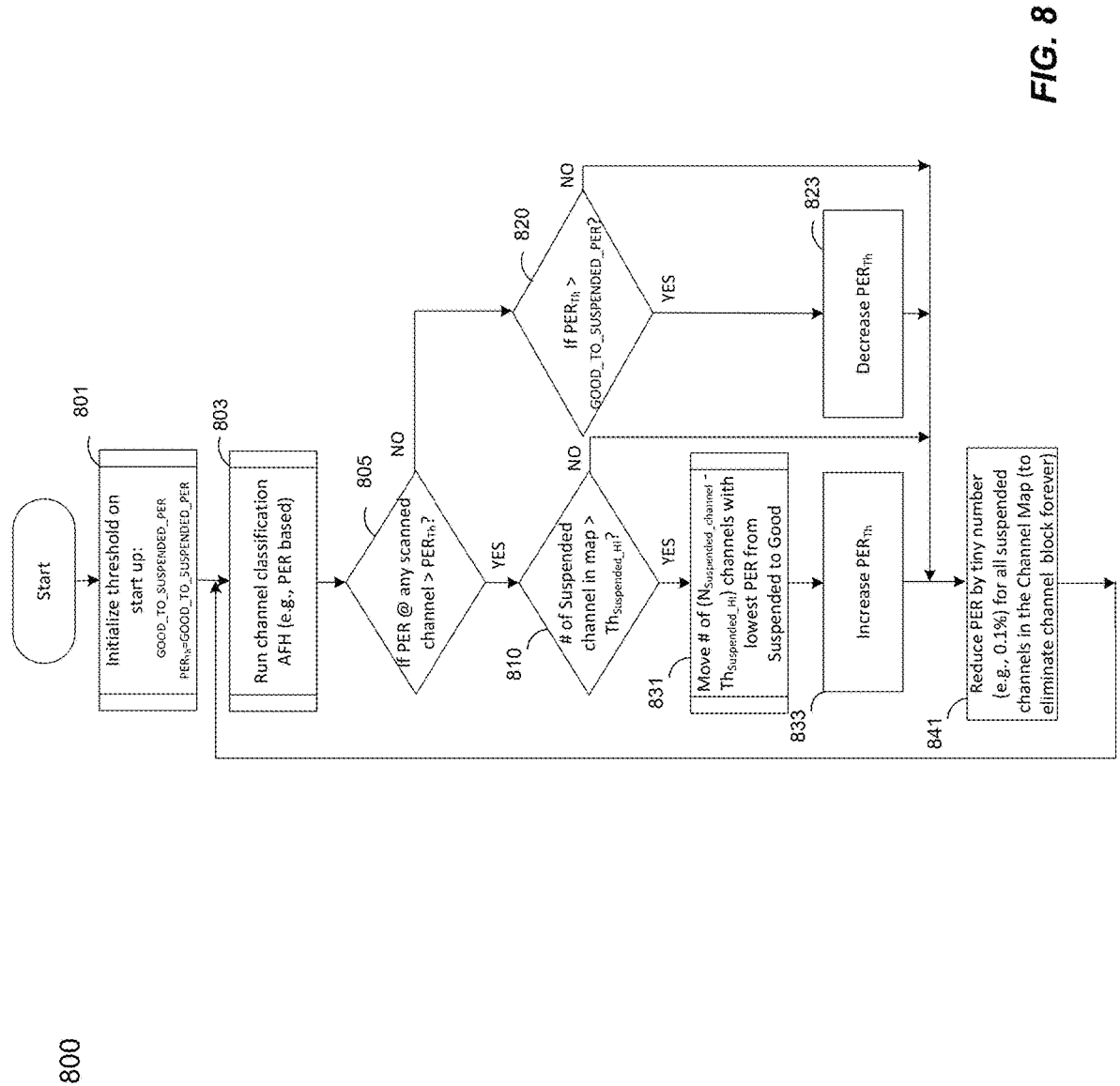
FIG. 8 is a flow diagram illustrating a method for a BLE receiver to classify BLE channels for AFH when receiving packets by dynamically adjusting a PER-threshold used for the channel classification based on a number of suspended channels and the PER-threshold value according to an embodiment.

FIG. 8 is a flow diagram illustrating a method 800 for a BLE receiver to classify BLE channels for AFH when receiving packets by dynamically adjusting a PER-threshold used for the channel classification based on a number of suspended channels and the PER-threshold value according to an embodiment. Method 800 may be part of a channel assessment algorithm performed by a BLE receiver to update an AFH channel map.

In operation 801, the BLE receiver may initialize $PER_{th}$ that is compared against the measured PER for a channel to determine whether to suspend a channel. The BLE receiver may initialize $PER_{th}$ to the preconfigured value of good_to_suspended_PER. In one embodiment, $PER_{th}$ may be the PER threshold for deep fading ($PER_{Th\_f}$) of FIG. 4.

In operation 803, the BLE receiver may run the channel assessment algorithm to measure the PER for the channels of a frequency band and to update the AFH channel mapping based on the measured PER. In one embodiment, operation 803 may be method 400 of FIG. 4 or method 500 of FIG. 5. The AFH channel map may contain information on the classification of suspended channels as shown in FIG. 6.

In operation 805, the BLE receiver may determine if the measured PER for any scanned channels in the channel assessment algorithm of operation 803 is greater than $PER_{th}$. Operation 805 may determine if any channels have been suspended in the current channel classification update interval.

If the measured PER for at least one scanned channel is greater than $PER_{th}$ so that at least one channel is suspended, in operation 810, the BLE receiver may determine if the number of suspended channels ($N_{suspended\_channel}$) in the AFH channel map is greater than a threshold $Th_{suspended\_Hi}$. $Th_{suspended\_Hi}$ may represent the maximum number of suspended channels to ensure there are a sufficient number of good channels available for AFH. $Th_{suspended\_Hi}$ may be configured based on the number of channels in the frequency band and the operating environment.

If the number of suspended channels ($N_{suspended\_channel}$) in the AFH channel map is greater than $Th_{suspended\_Hi}$, in operation 831, the BLE receiver may move ($N_{suspended\_channel}$-$Th_{suspended\_Hi}$) channel(s) with the lowest PER among all suspended channels in the AFH channel map from the suspended classification to good. The BLE receiver may thus reclaim ($N_{suspended\_channel}$-$Th_{suspended\_Hi}$) suspended channel(s) that experience the least deep-fading so as to bring $N_{suspended\_channel}$ down to $Th_{suspended\_Hi}$.

In operation 833, the BLE receiver may increase $PER_{th}$ so that at the next channel classification update interval, the reclaimed channels are not immediately re-suspended if the measured PER for the reclaimed channels remains the same.

In operation 841, the BLE receiver may reduce the measured PER for all suspended channels in the AFH channel map by a small amount (e.g., 0.1%). Reducing the measured PER for the suspended channels after each channel classification update interval may eliminate the possibility that channels are suspended indefinitely by increasing the chance that a suspended channel may be reclaimed.

If from operation 810, the number of suspended channels ($N_{suspended\_channel}$) in the AFH channel map is not greater than $Th_{suspended\_Hi}$, the BLE receiver does not reclaim any suspended channels or change $PER_{th}$, and may invoke operation 841 to reduce the measured PER for all suspended channels in the AFH channel map by a small amount.

If from operation 805, the measured PER for all scanned channels are not greater than $PER_{th}$, in operation 820, the BLE receiver may determine if $PER_{th}$ is greater than the preconfigured good_to_suspended_PER. When none of the measured PER for the scanned channels are greater than $PER_{th}$, and $PER_{th}$ is greater than good_to_suspended_PER, it may indicate that $PER_{th}$ has been raised too high such that no channels have been suspended. For example, when operation 833 increases $PER_{th}$ to prevent the resuspension of reclaimed channels least corrupted by deep fading, the higher $PER_{th}$ may also be preventing other channels that experience more deep fading from being suspended.

If $PER_{th}$ is greater than good_to_suspended_PER, in operation 823, the BLE receiver may decrease $PER_{th}$ so that at the next channel classification update interval, the channel assessment algorithm may suspend channel(s) that have higher measured PER than the lowered $PER_{th}$ due to deep fading. The BLE receiver may invoke operation 841 to reduce the measured PER for all suspended channels in the AFH channel map by a small amount.

If $PER_{th}$ is not greater than good_to_suspended_PER, $PER_{th}$ stays the same for the next channel classification update interval. The BLE receiver may invoke operation 841 to reduce the measured PER for all suspended channels in the AFH channel map by a small amount.

After operation 841, the BLE receiver may run the channel assessment algorithm in operation 803 for the next channel classification update interval to update the AFH channel map. Operations 805, 810, 831, 833, 820, 823, and 841 may be repeated after every channel classification update interval to dynamically adjust the $PER_{th}$.

Figure 9:
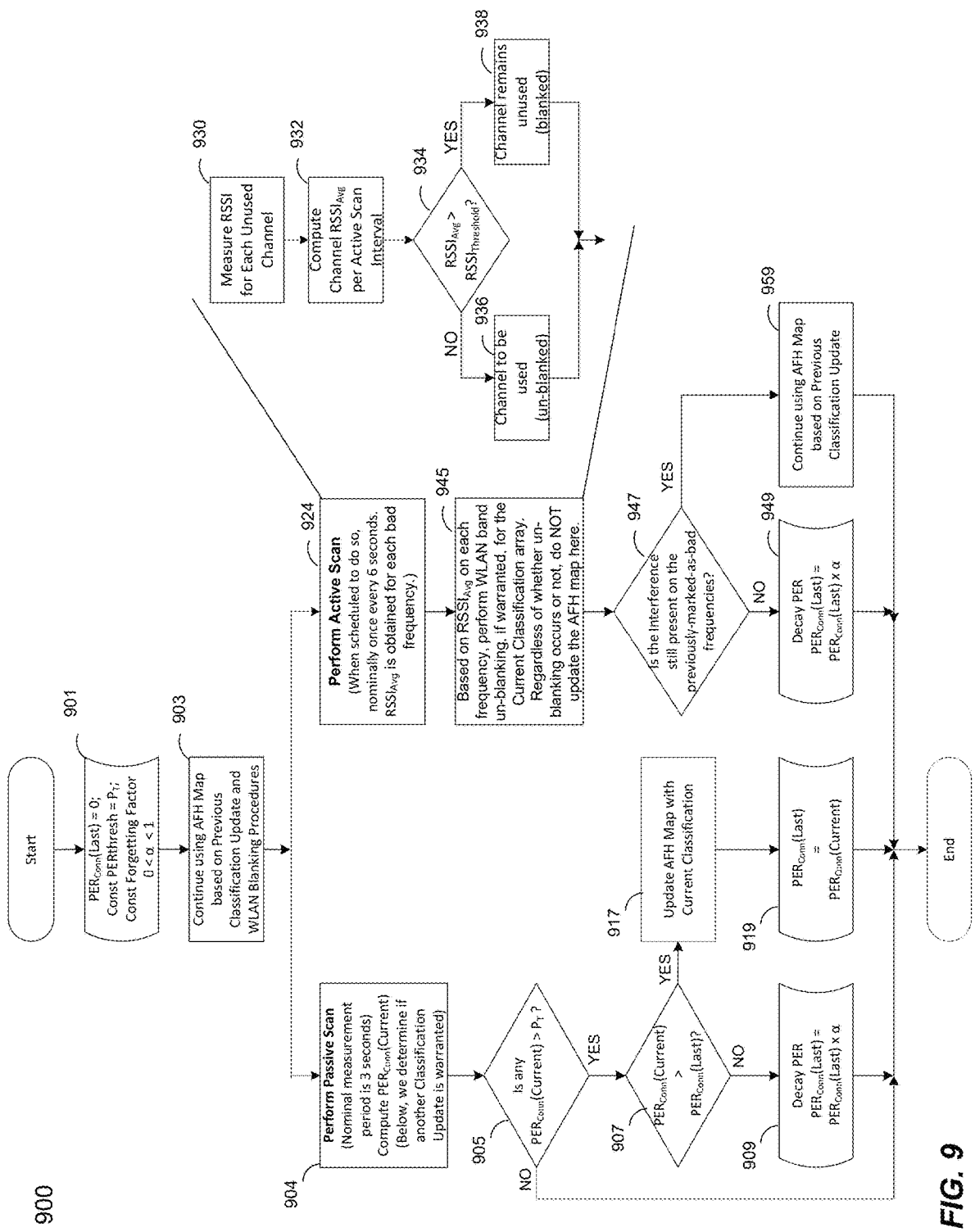
FIG. 9 is a flow diagram illustrating a method for a BLE receiver to update an AFH channel map based on passive and active scans, and comparisons of the PER of received packets on a channel during a current iteration of the passive scan with that of a previous iteration of the passive scan according to an embodiment.

FIG. 9 is a flow diagram illustrating a method 900 for a BLE receiver to update an AFH channel map based on passive and active scans, and comparisons of the PER of received packets on a channel during a current iteration of the passive scan with that of a previous iteration of the passive scan according to an embodiment. Method 900 may be part of a channel assessment algorithm performed by a BLE receiver to update an AFH channel map.

In operation 901, the BLE receiver may initialize a $PER_{conn}$(Last) that holds the last value of the measured PER for a channel to 0. The BLE receiver may initialize $PER_{threshold}$ that is compared against the measured PER for a channel to determine whether to suspend a channel. The BLE receiver may initialize $PER_{threshold}$ to a preconfigured Pr. In one embodiment, $PER_{threshold}$ may be the PER threshold ($PER_{Th}$) for suspending a channel of FIG. 5. The BLE receiver may also initialize a decaying factor α, used to decay $PER_{conn}$(Last), to a value between 0 and 1. Decaying the last measured PER for a channel may eliminate the possibility that the channel is suspended indefinitely.

In operation 903, the BLE receiver may use the AFH channel map based on a previous channel classification update and may blank (suspend) channels including channels corrupted by WLAN interference. The AFH channel map may contain information on the classification of suspended channels as shown in FIG. 6, including suspended channels classified as WLAN interference channels.

In operation 904, the BLE receiver may perform a passive scan to measure the PER for the channels of a frequency band based on the packets received over the channels in a nominal measurement period (e.g., 3 seconds). In one embodiment, the BLE receiver may receive the packets over channels that are classified as good channels or over WLAN interference channels that have been temporarily un-blanked. In one embodiment, operation 904 may be method 500 of FIG. 5.

In operation 905, the BLE receiver may determine if the measured PER for any channel for the current measurement period ($PER_{conn}$(Current)) is greater than $PER_{threshold}$ (PT). Operation 905 may thus determine if at least one channel may be suspended based on the latest measured PER.

If $PER_{conn}$(Current) for any channel is greater than $PER_{threshold}$, in operation 907, the BLE receiver may determine if $PER_{conn}$(Current) for a channel is greater than $PER_{conn}$(Last). Operation 907 may thus determine if the PER for a channel measured over the current measurement period is increasing compared to the PER for the channel measured over the last measurement period.

If $PER_{conn}$(Current) for a channel is greater than $PER_{conn}$(Last), in operation 917, the BLE receiver may update the AFH channel map for the channel based on the current channel classification. For example, the AFH channel map may be updated to suspend any previously clean channel if $PER_{conn}$(Current) for the channel is now greater than $PER_{threshold}$. Conversely, any temporarily un-blanked WLAN interference channel may be reclaimed if $PER_{conn}$ (Current) for the channel no longer exceeds PER threshold.

In operation 919, the BLE receiver may assign $PER_{conn}$ (Last) for a channel to be $PER_{conn}$(Current) for the channel to prepare for the passive scan to measure the PER for the channel over the next measurement period.

If $PER_{conn}$(Current) for a channel is not greater than $PER_{conn}$(Last), in operation 909, the BLE receiver may decay PER conn (Last) for the channel by the decaying factor α.

In operation 924, the BLE receiver may perform an active scan to measure the average RSSI ($RSSI_{avg}$) for any suspended channel in the AFH channel map. In contrast to the passive scan of operation 904 in which the BLE receiver assesses the channels based on packets received over any channels, the BLE may need to schedule a time interval and channel resources for an active scan of suspended channels The BLE receiver may perform the active scan when scheduled or over a configurable time interval (e.g., every 6 seconds). In one embodiment, the BLE receiver may perform the active scan in the background when the BLE transceiver is not active.

In operation 945, based on the $RSSI_{avg}$ measured for each suspended channel during the active scan, the BLE receiver may un-blank a channel. For example, the BLE receiver may temporarily un-blank a WLAN interference channel if the measured $RSSI_{avg}$ for the channel falls below a threshold. Even though the channel is un-blanked, the BLE receiver may not yet update the AFH channel map to indicate that the un-blanked channel has been reclaimed as a good channel.

In one embodiment, to perform the active scan and to un-blank a WLAN interference channel of operation 924 and 945, the BLE receiver may measure the RSSI of packets for each suspended channel in operation 930. In operation 932, the BLE receiver may average the RSSI measured for all the packets received on a channel over the active scan interval to compute $RSSI_{avg}$ for each suspended channel. In operation 934, the BLE receiver may compare $RSSI_{avg}$ for each suspended channel with a $RSSI_{Threshold}$. If the $RSSI_{avg}$ for a suspended channel is greater than a $RSSI_{Threshold}$, the channel may remain suspended (blanked) in operation 938 due to WLAN interference. On the other hand, if the $RSSI_{avg}$ for a suspended channel is not greater than a $RSSI_{Threshold}$, the BLE receiver may un-blank the channel in operation 936 to temporarily use the channel. As indicated, even though the channel is un-blanked, the AFH channel map is not updated until a later time (e.g., at operation 917).

In operation 947, the BLE receiver may determine if the interference is still present on all the previously suspended channels. For example, the interference is still present on a suspended channel when the $RSSI_{avg}$ for the channel measured during the active scan interval is greater than $RSSI_{Threshold}$ (operations 934 and 938).

If the interference is still present on the suspended channel, in operation 959, the BLE receiver may continue to use the AFH channel map based on the previous classification update based on the passive scan (e.g., from operation 917).

On the other hand, if the interference is no longer present on the suspended channel, in operation 949, the BLE receiver may decay PER conn (Last) for the channel by the decaying factor α. For example, if a WLAN interference channel is temporarily un-blanked in operation 936 because the $RSSI_{avg}$ for the channel is no longer greater than a $RSSI_{Threshold}$, the BLE receiver may decay the $PER_{conn}$ (Last) for the un-blanked channel. Decaying the $PER_{conn}$ (Last) for the temporarily un-blanked channel increases the chance that the channel may eventually be reclaimed when the AFH channel map is updated.

Figure 10:
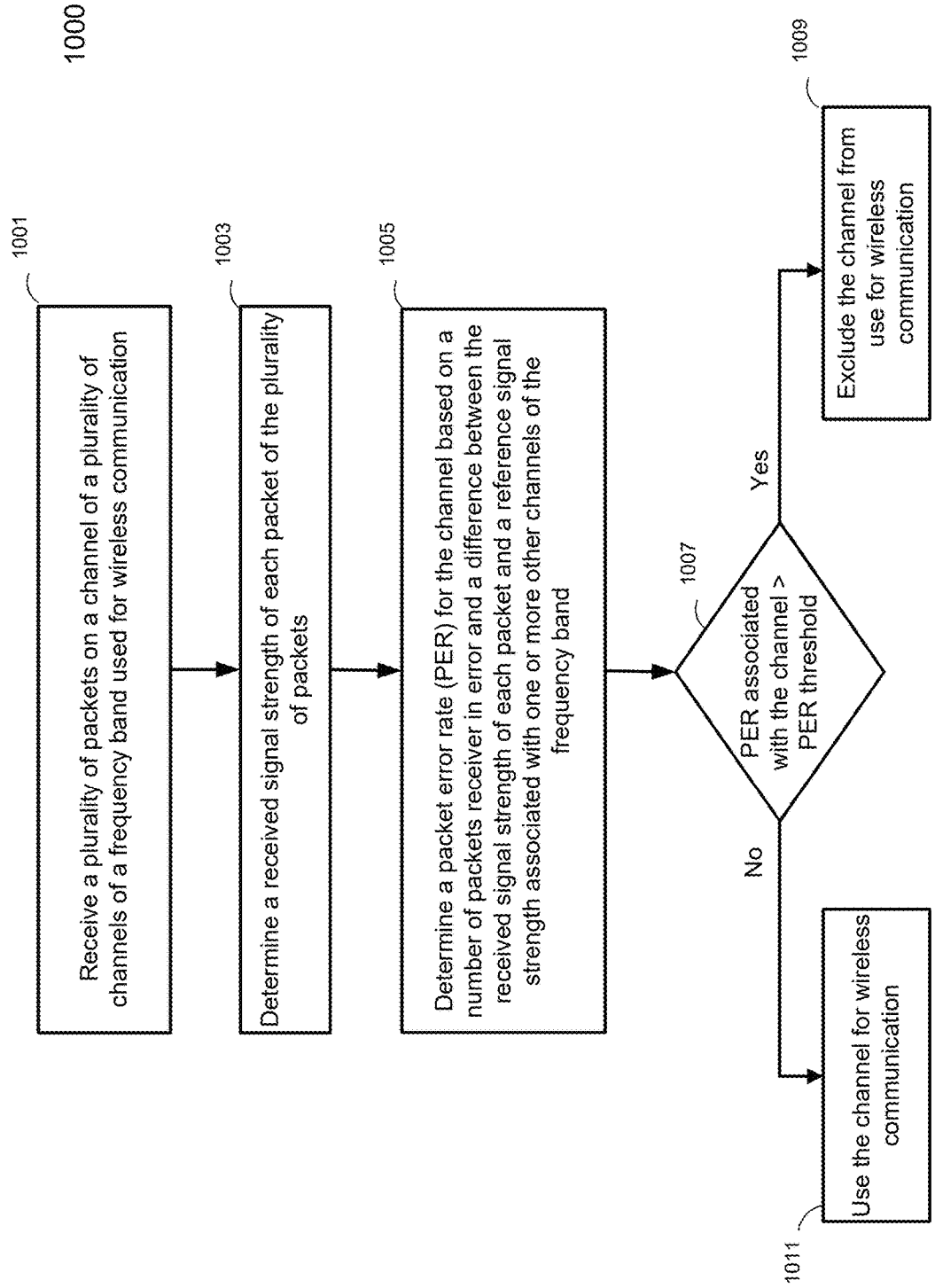
FIG. 10 is a flow diagram illustrating a method for a receiver to detect channel-specific deep fading when receiving packets over a range of channels to exclude the channel from use according to one embodiment.

FIG. 10 is a flow diagram illustrating a method 1000 for a receiver to detect channel-specific deep fading when receiving packets over a range of channels to exclude the channel from use according to one embodiment. Method 1000 may be performed by a BLE receiver, such as the Bluetooth device of FIG. 11.

In operation 1001, the BLE receiver receives multiple packets on one of multiple channels of a frequency band used for wireless communication.

In operation 1003, the BLE receiver determines a received signal strength (e.g., RSSI) for each of the packets received over the one channel.

In operation 1005, the BLE receiver determines a packet error rate (PER) for the channel based on a number of packets received in error and a difference between the received signal strength of each packet and a reference signal strength associated with one or more other channels of the frequency band.

In operation 1007, the BLE receiver determines if the PER associated with the channel is greater than a PER threshold.

In operation 1009, if the PER associated with the channel is greater than the PER threshold, the BLE receiver excludes the channel from use for wireless communication.

In operation 1011, if the PER associated with the channel is not greater than the PER threshold, the BLE receiver uses the channel for wireless communication.

Figure 11:
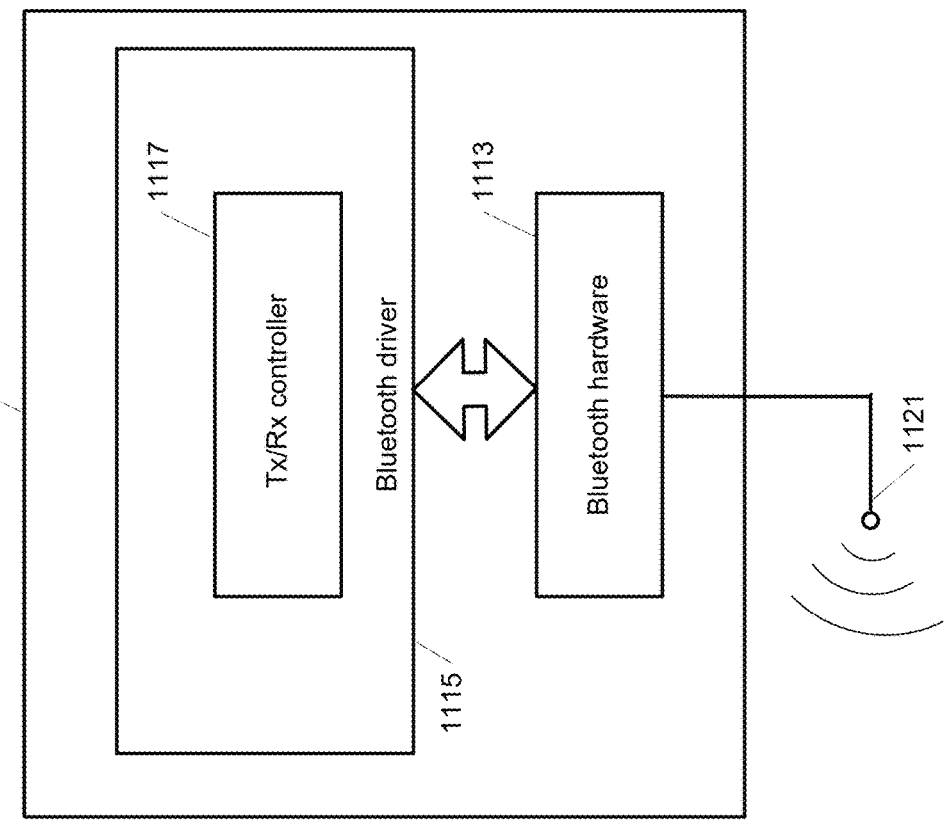
FIG. 11 depicts a block diagram of a Bluetooth device showing hardware and software drivers deployed to scan channels to classify BLE channels, including channel-specific deep fading, for an AFH channel map according to one embodiment.

Various embodiments of the techniques for BLE devices to detect deep fading with low channel signal-to-noise ratio and signal distortion caused by rapid magnitude drop and phase change on channels within a frequency band of a narrowband wireless radio operating in a BMS-like environment with strong multipath may include various operations. Various embodiments of the techniques for BLE devices to dynamically adjust a PER-threshold used for classifying deep-fading channels based on a number of blacklisted channels to update the AFH channel map so there is a sufficient number of "good" channels for AFH may also include various operation. These operations may be performed and/or controlled by hardware components, digital hardware and/or firmware/programmable registers (e.g., as implemented in computer-readable medium), and/or combinations thereof. The methods and illustrative examples described herein are not inherently related to any particular device or other apparatus. Various systems (e.g., such as a wireless device including an antenna, a radio frequency (RF) transceiver, a controller operating in a near field environment, pico area network, wide area network, etc.) may be used in accordance with the teachings described herein, or it may prove convenient to construct more specialized apparatus to perform the required method steps. The required structure for a variety of these systems will appear as set forth in the description above FIG. 11 depicts a block diagram of a Bluetooth device 1111 showing hardware and software drivers deployed to scan channels to classify BLE channels, including channel-specific deep fading, for an AFH channel map according to one embodiment. The Bluetooth device 111 may practice the methods of any of FIG. 4-5, or 7-10.

The Bluetooth device 1111 may include one or more antennas 1121, Bluetooth hardware 1113 and Bluetooth driver 1115. The Bluetooth driver 1115 may include Bluetooth Tx/RX controller 1117 (e.g., Bluetooth core scheduler or link manager). The Bluetooth hardware 1113 may include a RF transceiver configured to transmit or receive packets on one or more channels of a Bluetooth frequency band. The Bluetooth Tx/RX controller 1117 may execute a channel assessment algorithm to scan channels to classify the channels as corrupted by deep fading, Wi-Fi interference, or weak signal, and to update an AFH channel map showing suspended channels not used for AFH and good channels that may be used for AFH.

In one embodiment, the Bluetooth device 1111 may include a memory and a processing device (e.g., Bluetooth Tx/RX controller 1117). The memory may be synchronous dynamic random access memory (DRAM), read-only memory (ROM)), or other types of memory, which may be configured to store the code to perform the function of the Bluetooth driver 1115. The processing device may be provided by one or more general-purpose processing devices such as a microprocessor, central processing unit, or the like. In an illustrative example, the processing device may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device may also comprise one or more special-purpose processing devices such as an application specific integrated circuit (ASIC), a field programmable gate array (FPGA), a digital signal processor (DSP), network processor, or the like. The processing device may be configured to execute the operations described herein, in accordance with one or more aspects of the present disclosure, for performing the operations and steps discussed herein.

A computer-readable medium used to implement operations of various aspects of the disclosure may be non-transitory computer-readable storage medium that may include, but is not limited to, electromagnetic storage medium, magneto-optical storage medium, read-only memory (ROM), random-access memory (RAM), erasable programmable memory (e.g., EPROM and EEPROM), flash memory, or another now-known or later-developed non-transitory type of medium that is suitable for storing configuration information.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "may include", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing. For example, certain operations may be performed, at least in part, in a reverse order, concurrently and/or in parallel with other operations.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component.

Additionally, "configured to" or "configurable to" can include generic structure (e.g., generic circuitry) that is manipulated by firmware (e.g., an FPGA) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method of detecting interference in wireless communication, comprising:
   receiving, by a device, a plurality of packets on a channel of a plurality of channels of a frequency band used for communication network;
   determining a received signal strength of each packet of the plurality of packets;
   determining, based on the received signal strength, a packet error rate (PER) for the channel based on a number of packets received in error and a proportion of the plurality of packets that are corrupted due to deep fading;
   determining whether the PER for the channel is greater than a PER threshold; and
   excluding the channel from use for wireless communication responsive to the PER for the channel being greater than the PER threshold.

2. The method of claim 1, wherein determining the PER for the channel comprises:
   determining a difference between the received signal strength of each packet of the plurality of packets and the reference signal strength when the packet is received in error; and
   determining the packet is corrupted due to deep fading when the difference is greater than a gradient threshold.

3. The method of claim 2, wherein determining the PER for the channel further comprises:
   determining the packet is corrupted due to signal interference when the difference fails to be greater than the gradient threshold and the signal strength of the packet is greater than an interference threshold;
   determining a dominant type of corruption based on a larger of a number of the plurality of packets corrupted due to deep fading and a number of the plurality of packets corrupted due to signal interference; and
   determining the PER for the channel as a portion of the plurality of packets that are corrupted due to the dominant type of corruption.

4. The method of claim 3, wherein excluding the channel from use comprises:
   determining the channel as experiencing the dominant type of corruption when the PER for the channel is greater than the PER threshold.

5. The method of claim 3, wherein determining the PER for the channel further comprises:
   determining the packet is corrupted due to weak signal when the difference fails to be greater than the gradient threshold and the signal strength of the packet is less than a weak signal threshold, wherein the weak signal threshold is less than the interference threshold;
   determining a dominant type of corruption based on a largest among a number of the plurality of packets corrupted due to deep fading, a number of the plurality of packets corrupted due to signal interference, and a number of the plurality of packets corrupted due to weak signal; and
   determining the PER for the channel as a portion of the plurality of packets that are corrupted due to the dominant type of corruption.

6. The method of claim 1, wherein excluding the channel from use comprises:
   determining the channel is a deep fading channel when the PER for the channel is greater than the PER threshold.

7. The method of claim 1, wherein the reference signal strength comprises an average received signal strength of a subset of the plurality of channels surrounding the channel associated with the plurality of packets.

8. The method of claim 1, wherein the reference signal strength comprises an average signal strength of a second channel adjacent to the channel associated with the plurality of packets.

9. The method of claim 1, further comprising:
   adjusting the PER threshold based on a number of the plurality of channels excluded from use for wireless communication.

10. The method of claim 1, further comprising:
    using the channel for wireless communication in responsive to the PER for the channel is determined as failing to be greater than the PER threshold.

11. The method of claim 1, further comprising:
    determining a channel map containing information on one or more of the channels excluded from use for wireless communication, wherein the information includes a classification of interference on each of the channels and the PER for each of the channels.

12. The method of claim 11, further comprising:
    reclaiming a subset of the channels excluded from use when a number of channels excluded from use is greater than a maximum channel threshold, wherein the subset of the channels reclaimed is determined based on the PER for the channels in the channel map.

13. An apparatus comprising:
    a processing unit configured to:
    receive a plurality of packets on a channel of a plurality of channels of a frequency band used for communication network;
    determine a received signal strength of each packet of the plurality of packets;
    determine, based on the received signal strength, a packet error rate (PER) for the channel based on a number of packets received in error and a proportion of the plurality of packets that are corrupted due to deep fading;
    determine whether the PER for the channel is greater than a PER threshold; and
    exclude the channel from use for wireless communication responsive to the PER for the channel being greater than the PER threshold.

14. The apparatus of claim 13, wherein to determine the PER for the channel, the processing unit is further configured to:
    determine a difference between the received signal strength of each packet of the plurality of packets and the reference signal strength when the packet is received in error; and determine the packet is corrupted due to deep fading when the difference is greater than a gradient threshold.

15. The apparatus of claim 14, wherein to determine the PER for the channel, the processing unit is further configured to:
- determine the packet is corrupted due to signal interference when the difference fails to be greater than the gradient threshold and the signal strength of the packet is greater than an interference threshold;
- determine a dominant type of corruption based on a larger of a number of the plurality of packets corrupted due to deep fading and a number of the plurality of packets corrupted due to signal interference; and
- determine the PER for the channel as a portion of the plurality of packets that are corrupted due to the dominant type of corruption.

16. The apparatus of claim 15, wherein to exclude the channel from use, the processing unit is further configured to:
- determine the channel as experiencing the dominant type of corruption when the PER for the channel is greater than the PER threshold.

17. The apparatus of claim 13, wherein to exclude the channel from use, the processing unit is further configured to:
- determine the channel is a deep fading channel when the PER for the channel is greater than the PER threshold.

18. The apparatus of claim 13, wherein the reference signal strength comprises an average received signal strength of a subset of the plurality of channels surrounding the channel associated with the plurality of packets.

19. The apparatus of claim 13, wherein the reference signal strength comprises an average signal strength of a second channel adjacent to the channel associated with the plurality of packets.

20. The apparatus of claim 13, wherein the processing unit is further configured to:
- adjust the PER threshold based on a number of the plurality of channels excluded from use for wireless communication.

* * * * *